(12) United States Patent
Gunnarsson et al.

(10) Patent No.: US 10,904,341 B2
(45) Date of Patent: Jan. 26, 2021

(54) METHOD FOR USING A CONTROL DEVICE IN DIFFERENT DATA TRANSMISSION SYSTEMS, CONTROL DEVICE, AND DATA TRANSMISSION SYSTEM FOR PERFORMING SUCH A METHOD

(71) Applicant: Bayerische Motoren Werke Aktiengesellschaft, Munich (DE)

(72) Inventors: Dan Gunnarsson, Munich (DE); Matthias Kuntz, Munich (DE); Bernhard Beyer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 44 days.

(21) Appl. No.: 15/675,023

(22) Filed: Aug. 11, 2017

(65) Prior Publication Data

US 2017/0339233 A1 Nov. 23, 2017

Related U.S. Application Data

(63) Continuation of application No. PCT/EP2016/052479, filed on Feb. 5, 2016.

(30) Foreign Application Priority Data

Feb. 13, 2015 (DE) .................. 10 2015 202 666

(51) Int. Cl.
*G06F 15/173* (2006.01)
*H04L 29/08* (2006.01)
(Continued)

(52) U.S. Cl.
CPC ............ *H04L 67/125* (2013.01); *G06F 17/40* (2013.01); *H04L 67/12* (2013.01); *H04L 69/18* (2013.01)

(58) Field of Classification Search
CPC ....... H04L 67/125; H04L 67/12; H04L 69/18; G06F 17/40
(Continued)

(56) References Cited

U.S. PATENT DOCUMENTS 7,248,604 B2 * 7/2007 Sugar ...................... H04L 47/10
370/468
10,140,781 B2 * 11/2018 Blakemore ............ G06Q 10/06
(Continued)

FOREIGN PATENT DOCUMENTS

| CN | 101380936 A | 3/2009 |
| CN | 101867596 A | 10/2010 |

(Continued)

OTHER PUBLICATIONS

PCT/EP2016/052479, International Search Report dated May 6, 2016 (Two (2) pages).
(Continued)

*Primary Examiner* — Sm A Rahman
(74) *Attorney, Agent, or Firm* — Crowell & Moring LLP

(57) ABSTRACT

A control device is usable in a plurality of different data transmission systems in vehicles, where the control device includes a database which stores a set of configuration data records and is connected to a data transmission system selected from the plurality of data transmission systems. The control device is configured to establish data transmission between the selected data transmission system and the control device by initializing a configuration data record from the set of configuration data records. The control device is also configured to check the initialized configuration data record by receiving validation data relating to the selected data transmission system and comparing said vali-
(Continued)

dation data with previously-determined data-transmission-system-specific validation data stored in a memory of the control device.

14 Claims, 2 Drawing Sheets

(51) Int. Cl.
*H04L 29/06* (2006.01)
*G06F 17/40* (2006.01)

(58) Field of Classification Search
USPC .......................................................... 709/244
See application file for complete search history.

(56) References Cited

U.S. PATENT DOCUMENTS

| | | | |
|---|---|---|---|
| 2003/0042792 A1 | 3/2003 | Reinold et al. | |
| 2011/0112718 A1 | 5/2011 | Claus et al. | |
| 2014/0306799 A1* | 10/2014 | Ricci | H04W 4/21 340/5.83 |
| 2015/0348336 A1* | 12/2015 | Kim | G07C 5/008 709/217 |

FOREIGN PATENT DOCUMENTS

| | | |
|---|---|---|
| CN | 102036856 A | 4/2011 |
| CN | 102474530 A | 5/2012 |
| CN | 104040497 A | 9/2014 |
| DE | 10 2004 059 981 A1 | 6/2006 |
| DE | 10 2008 024 979 A1 | 11/2009 |
| DE | 10 2011 102 770 A1 | 11/2012 |
| EP | 2 253 495 A3 | 11/2010 |
| KR | 100792422 B1 | 1/2008 |
| WO | WO 2009/141060 A1 | 11/2009 |

OTHER PUBLICATIONS

German Search Report issued in German counterpart application No. 10 2015 202 666.3 dated Apr. 25, 2017, with Statement of Relevancy (Ten (10) pages).

Chinese Office Action issued in Chinese counterpart application No. 201680004668.0 dated Sep. 19, 2019, with English translation (Twenty Four (24) pages).

Partial English machine translation for previously cited B4 (Seven (7) pages).

Chinese Office Action issued in Chinese application No. 201680004668.0 dated Jul. 3, 2020, with English translation (Twenty (22) pages).

* cited by examiner

METHOD FOR USING A CONTROL DEVICE IN DIFFERENT DATA TRANSMISSION SYSTEMS, CONTROL DEVICE, AND DATA TRANSMISSION SYSTEM FOR PERFORMING SUCH A METHOD

CROSS REFERENCE TO RELATED APPLICATIONS

This application is a continuation of PCT International Application No. PCT/EP2016/052479, filed Feb. 5, 2016, which claims priority under 35 U.S.C. § 119 from German Patent Application No. 10 2015 202 666.3, filed Feb. 13, 2015, the entire disclosures of which are herein expressly incorporated by reference.

BACKGROUND AND SUMMARY OF THE INVENTION

The invention relates to a method for using a control device in different data transmission systems, in particular in different data transmission systems in vehicles. The invention also relates to a control device for use in different data transmission systems, in particular in different data transmission systems in vehicles. The invention also relates to a data transmission system and to a vehicle comprising a control device and/or a data transmission system for using a control device.

Control devices are used in many electronic areas in the motor vehicle sector. In this case, control devices in the vehicles are connected to one another via different system buses. Control devices interchange, for example, information relating to the operating states and further relevant data in the vehicle throughout the system via said system buses.

To this point, control devices have usually been developed for a very specific environment or for a very specific data transmission system. This specific environment/data transmission system may be a specific vehicle type or else a specific product line. In this case, it is conceivable for control devices to be developed for a single equipment variant of a vehicle. If such control devices are intended to be used with unchanged functionality in another, new or additional vehicle or environment, this results in a further version of the control device, which is specifically configured for this other, new or additional task, having to be respectively developed. In principle, although such control devices have the same functions, they are incompatible at the data transmission level.

Accordingly, control devices have hitherto been respectively developed and provided for a specific data transmission system, a data transmission system being a group of control devices which communicate with one another with at least one bus system.

On the basis of this prior art, an object of the present invention is to provide a method for using a control device in different data transmission systems, in particular in different data transmission systems in vehicles. In particular, the object of the present invention is to reduce the number of control devices to be configured for different data transmission systems.

It is also an object of the present invention to specify an accordingly developed control device and a data transmission system for performing such a developed method.

In particular, an object of the present invention may be achieved by a method for using a control device in different data transmission systems, in particular in different data transmission systems in vehicles, the control device comprising a database which stores a set of configuration data records, comprising the steps of:

a) starting the control device which is connected to a data transmission system selected from a multiplicity of data transmission systems;

b) establishing data transmission between the selected data transmission system and the control device by initializing a configuration data record from the set of configuration data records;

c) checking the initialized configuration data record, the control device receiving validation data relating to the selected data transmission system and comparing said data with previously determined data transmission system-specific validation data stored in a memory of the control device.

In other words, a method for using a single control device in different data transmission systems is provided. The data transmission system can be understood as meaning a group having at least one control device, preferably a plurality of control devices, with at least one bus system.

There are accordingly numerous data transmission systems, depending on different vehicle types or equipment variants of different vehicle types. The method according to the invention provides for a control device to be designed and used in such a manner that this control device can be used in different data transmission systems. For this purpose, the control device comprises a database which stores a set of configuration data records. A configuration data record is accordingly provided for using a control device in a particular data transmission system. The more configuration data records are stored in the database of the control device, the more possible uses arise for the control device. In other words, the control device can be used in a higher number of data transmission systems with an increasing number of stored configuration data records.

The method according to the invention first of all provides for the control device to be connected to a data transmission system selected from a multiplicity of data transmission systems and to then be started or started up. A control device is connected to a data transmission system, in particular to a bus system of the data transmission system by means of a plug connection, for example.

According to step b), data transmission is then established between the selected data transmission system and the control device by initializing a configuration data record from the set of configuration data records. In other words, the control device is started in a configuration, such that it is possible to transmit data between the control device and the selected data transmission system. The initialization of a configuration data record from the set of configuration data records therefore describes the operation of the control device by means of a configuration data record or by means of a selected configuration.

In step c), the initialized configuration data record is checked, the control device receiving validation data relating to the selected data transmission system and comparing said data with previously determined data transmission system-specific validation data stored in a memory of the control device. Step c) checks whether the initialized configuration data record is designed for using the control device in the selected data transmission system. For this purpose, the data transmission system transmits validation data to the control device which compares the received validation data with data transmission system-specific validation data stored in a memory. The data transmission system-specific validation data may be stored in the database already described, for example. It is also conceivable to store the data transmission system-specific validation data in an additional memory of the control device.

The data transmission system-specific validation data are included in previously determined coding data. In other words, the data transmission system-specific validation data are partial data of previously determined coding data. Coding data can be understood as meaning those data items which code the control device before use in a data transmission system. Coding serves the purpose of activating or determining the configuration data record suitable for the selected data transmission system, for example. The coding data may also comprise selection data for selecting a determination configuration data record from the set of configuration data records.

The determination configuration data record can be understood as meaning that configuration data record which is especially suitable or expedient for using the control device in a selected data transmission system. In other words, a plurality of configurations are held in the control device, the respectively suitable configuration being determined or selected on the basis of the selected data transmission system by determining coding data, for example.

Provision may be made, in step b), that is to say when establishing data transmission between the selected data transmission system and the control device, for the determination configuration data record to be initialized. In other words, the control device is started and data transmission is then established between the control device which has been started and the selected data transmission system by initializing or activating the determination configuration data record and the associated configuration.

Alternatively, it is conceivable, in step b), for a minimum configuration data record included in the set of configuration data records to be initialized. With the aid of the minimum configuration data record and the initialization of the minimum configuration data record, the control device can be operated in such a configuration mode that the ability for diagnostic communication is retained, for example. In other words, it is therefore conceivable for the data to be transmitted between the control device and the data transmission system by initializing or activating the minimum configuration data record after starting the control device (step a).

Provision may be made, in step c), for the selected data transmission system to transmit the chassis number of the vehicle to the control device. In this context, the chassis number is used as validation data transmitted by the selected data transmission system. If the method according to the invention for using a control device relates to the use of a control device in different data transmission systems in vehicles, the chassis number of a vehicle is suitable as a particularly simple means of validation.

In another embodiment of the invention, it is conceivable for each data transmission system to have its unique criterion and therefore be able to transmit unique validation data.

The determination and storage of coding data/of the coding data are preferably carried out before step a), in particular before connecting the control device to the selected data transmission system or by connecting the control device to the selected data transmission system. In other words, the determined or selected coding data are stored in the control device, in particular in a memory of the control device, at a time at which the control device is not yet connected to the selected data transmission system.

If the coding data are intended to be stored in the control device before the control device is connected to the selected data transmission system, this can be effected by transmitting data between the control device and a coding device or a maintenance device. When determining and storing the coding data by connecting the control device to the selected data transmission system, this can be effected by means of known connector coding. In other words, the determination and storage of the coding data/of coding data are carried out by plugging the control device into a bus system of the data transmission system, for example.

After carrying out step c), that is to say after checking the initialized configuration data record, the following additional steps are carried out, for example:

d) validating the initialized configuration data record, in particular the initialized determination configuration data record, if it is determined, in step c), that the received validation data match the data transmission system-specific validation data.

In other words, the initialized configuration data record, in particular the initialized determination configuration data record, is validated if the received validation data match the stored data transmission system-specific validation data. If the data transmission system transmits a chassis number to the control device, for example, and this chassis number matches the chassis number stored in the control device, it is concluded therefrom that the initialized configuration data record is the determination configuration data record and the selected configuration has actually been selected for the appropriate data transmission system.

Alternatively, provision may be made, in a further step, for e) a/the minimum configuration data record to be stored in a memory, in particular a non-volatile memory, of the control device and for the minimum configuration data record to be defined as the configuration data record to be initialized.

Step e) is carried out, for example, when:

a difference between the received validation data and the data transmission system-specific validation data is determined in step c), and/or step c) is not carried out within a previously determined period, that is to say a timeout occurs when checking the initialized configuration data record, and/or the database of the control device is damaged, and/or the data transmission system-specific validation data cannot be recognized.

The described possibilities which cause a/the minimum configuration data record to be stored in a memory of the control device are therefore both faults and active recognition of a difference between the received validation data and the data transmission system-specific validation data.

A minimum data transmission mode of the control device is started when initializing a/the minimum configuration data record or when activating a minimum configuration data record, diagnostic data transmission being able to be carried out and/or an error message being able to be output in the minimum data transmission mode. Initializing a/the minimum configuration data record is a cross-configuration fallback level (minimum schedule). Starting a minimum data transmission mode of the control device makes it possible to retain, for example, the ability for diagnostic communication or diagnostic data transmission.

In connection with a minimum data transmission mode, the minimum specification is that incompatible data transmission is prevented between the control device and the data transmission system. In addition, it is conceivable for the minimum data transmission mode to cause the maintenance of a basic functionality of the control device.

In the simplest case, the minimum requirement imposed on a control device which is operated in the minimum data transmission mode is for data to be able to be transmitted inside the data transmission system as if the control device were not installed. If the minimum data transmission mode also ensures diagnostic data transmission, the control device can also be provided with newly determined coding data, for example, in this minimum data transmission mode. That is to say, new coding data can be stored in the control device during the minimum data transmission mode.

In one embodiment of the invention, it is conceivable for steps a) to c), in particular steps b) to c), in particular step c), to be repeated after carrying out step e), that is to say after storing a/the minimum configuration data record in a memory of the control device and defining the minimum configuration data record as the configuration data record to be initialized.

Steps a) to c), in particular steps b) to c), in particular step c), can be repeated until, for example, a determination configuration data record originally stored in the memory, in particular the non-volatile memory, of the control device, together with the data transmission system-specific validation data which have likewise been stored, are positively checked, that is to say until it is determined, in step c), that the received validation data match the stored data transmission system-specific validation data.

If it is determined, in step c), that the received validation data match the data transmission system-specific validation data in this manner, in step f) the determination configuration data record is stored in the memory, in particular the non-volatile memory, of the control device.

In addition, after carrying out step f), it is conceivable for steps a) to c), in particular steps b) to c), in particular step c), to be repeated, preferably at regular intervals. On account of steps a) to c), in particular steps b) to c), in particular step c), being repeated, it is possible to determine, for example, whether the control device is still connected to the selected data transmission system. In addition, faults, for example a timeout or the presence of a damaged database or configuration table on account of hardware faults or software faults, can be determined by repeating said steps.

The object mentioned at the outset is also achieved by means of a control device for use in different data transmission systems, in particular in different data transmission systems in vehicles, the control device comprising a database which stores a set of configuration data records, at least one configuration data record being able to be selected for the purpose of establishing data transmission with a selected data transmission system.

A previously described method according to the invention can be carried out with the aid of the control device according to the invention. The database included in the control device can also be referred to as a configuration table. The configuration table comprises different configuration data records, a particular configuration being assigned to each configuration data record, which configuration can be used to operate the control device in the state connected to a data transmission system.

The control device may also comprise a memory, in particular a non-volatile memory, which can store a configuration data record to be initialized. The following method sequence, for example, can be carried out with the aid of the database and the memory, in particular the non-volatile memory:

A configuration data record is selected from the set of configuration data records. Coding data are stored in the control device for the purpose of selecting a configuration data record. The coding data are protected, for example, using a checksum and a stored chassis number.

The control device connected to a data transmission system selected from a multiplicity of data transmission systems is then started.

The non-volatile memory is directly available when starting or starting up the control device. The initializing configuration data record stored in the memory is retrieved, with the result that data transmission is established between the selected data transmission system and the control device by initializing the configuration data record. This is preferably the determination configuration data record.

The initialized configuration data record is then checked, the control device receiving the chassis number of the vehicle, for example, from the data transmission system and comparing it with previously determined data transmission system-specific validation data stored in a memory of the control device. This memory may be a separate memory or the same memory in which the configuration data record to be initialized is also stored. In the event of a fault or if a difference between the received chassis number and the previously stored data transmission system-specific chassis number is determined, the initializing configuration data record in the non-volatile memory is overwritten with a/the minimum configuration data record.

The control device can then be restarted. The minimum configuration data record is initialized during the subsequent initialization of a configuration data record. In addition, when initializing the minimum configuration data record, it is continuously checked whether the received chassis number matches the stored data transmission system-specific chassis number. If this is the case, the determination configuration data record is stored in the memory and is initialized during the subsequent restarting of the control device.

The object mentioned at the outset is also achieved by means of a data transmission system, in particular for a vehicle system, comprising at least one control device according to the invention and a bus system.

The data transmission system may comprise, for example, a FlexRay bus and/or a CAN bus and/or a LIN bus and/or a MOST bus and/or Ethernet.

The object mentioned at the outset is also achieved by means of a vehicle comprising a control device according to the invention and/or a data transmission system according to the invention.

The invention is described below by means of a plurality of exemplary embodiments which are explained in more detail on the basis of drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
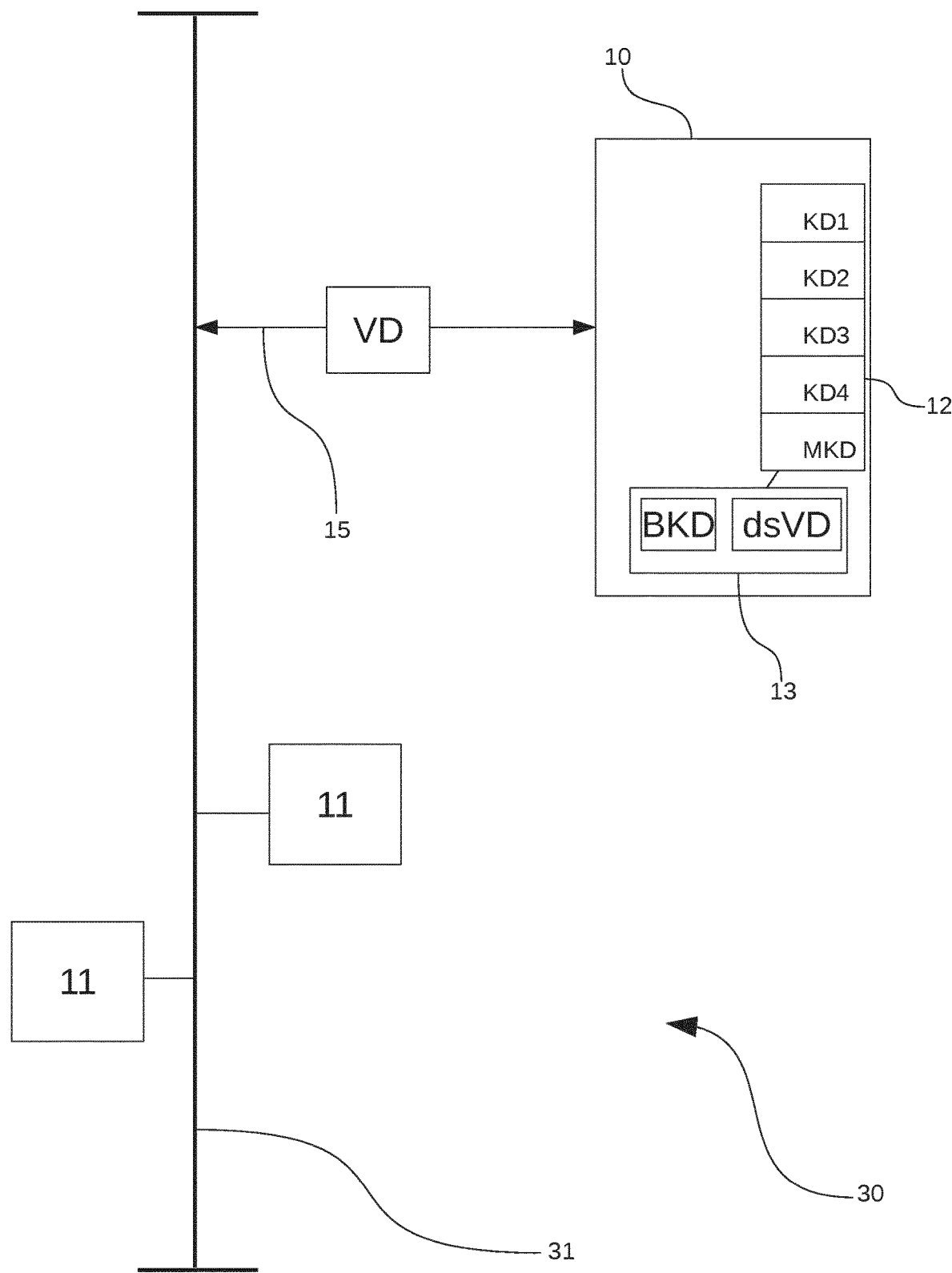
FIG. 1 shows a control device according to the invention in a first data transmission system for carrying out the method according to the invention according to a first embodiment.

FIG. 1 illustrates a data transmission system 30 which comprises a bus system 31 and a control device 10 according to the invention as well as two further control devices 11. The control device 10 according to the invention is connected to the bus system 31, namely to a FlexRay bus. The control device 10 according to the invention can transmit and receive messages via the bus system 31 and therefore can communicate with the other control devices 11 of the data transmission system 30.

The control device 10 comprises a database 12 which stores a set of configuration data records. In the example illustrated, the configuration data records KD1, KD2, KD3 and KD4 and a minimum configuration data record MKD are stored. It is conceivable for the database 12 to store a smaller or larger number of configuration data records. The size of the available database or the database memory restricts the number of configuration data records stored therein. The control device 10 can therefore be operated in five different configurations. Depending on the selection of the data transmission system, the control device 10 can be operated with a configuration which is stored in the database 12 and is suitable for the selected data transmission system. For this purpose, one of the five stored configuration data records needs to be initialized.

With the connection of the control device 10 to the data transmission system 30, coding can preferably be carried out in order to select the configuration data record suitable for the data transmission system 30. For this purpose, the memory 13 stores coding data which comprise, on the one hand, selection data for selecting a determination configuration data record BKD from the set of configuration data records KD1, KD2, KD3, KD4 and MKD.

The coding data also comprise data transmission system-specific validation data dsVD which are likewise stored in the memory 13 of the control device 10. The process of transmitting coding data when connecting the control device 10 to the data transmission system 30 is so-called connector coding.

The control device 10 which is connected to the data transmission system 30 is then started. Data transmission 15 is established between the data transmission system 30 and the control device 10 by initializing the determination configuration data record BKD.

The initialized configuration data record is then checked, the initialized configuration data record being the initialized determination configuration data record BKD in the present exemplary embodiment. This was previously selected as a suitable configuration data record and was stored in the memory 13 of the control device 10. The determination configuration data record BKD corresponds to one of the configuration data records KD1, KD2, KD3 or KD4. In order to check the initialized determination configuration data record BKD, the control device receives validation data VD relating to the selected data transmission system 30, the control device 10 comparing the received validation data VD with the previously determined data transmission system-specific validation data dsVD stored in the memory 13 of the control device 10.

Since the data transmission system 30 illustrated is installed in a vehicle, the data transmission system-specific validation data dsVD are the vehicle-specific chassis number (VIN). This chassis number or the data transmission system-specific validation data dsVD is/are compared with the received validation data VD.

If it is determined, when checking the initialized configuration data record BKD, that the received validation data VD match the data transmission system-specific validation data dsVD, the initialized configuration data record, which is the determination configuration data record BKD in this case, is validated, that is to say is declared valid. It is therefore ensured that the control device 10 is in the environment or data transmission system 30 suitable for the initialized determination configuration data record BKD. The further operation of the control device 10 is effected using the configuration predefined by the determination configuration data record BKD. Incompatible data transmission between the control device 10 and the data transmission system 30 is prevented by checking the initialized configuration data record.

Figure 2:
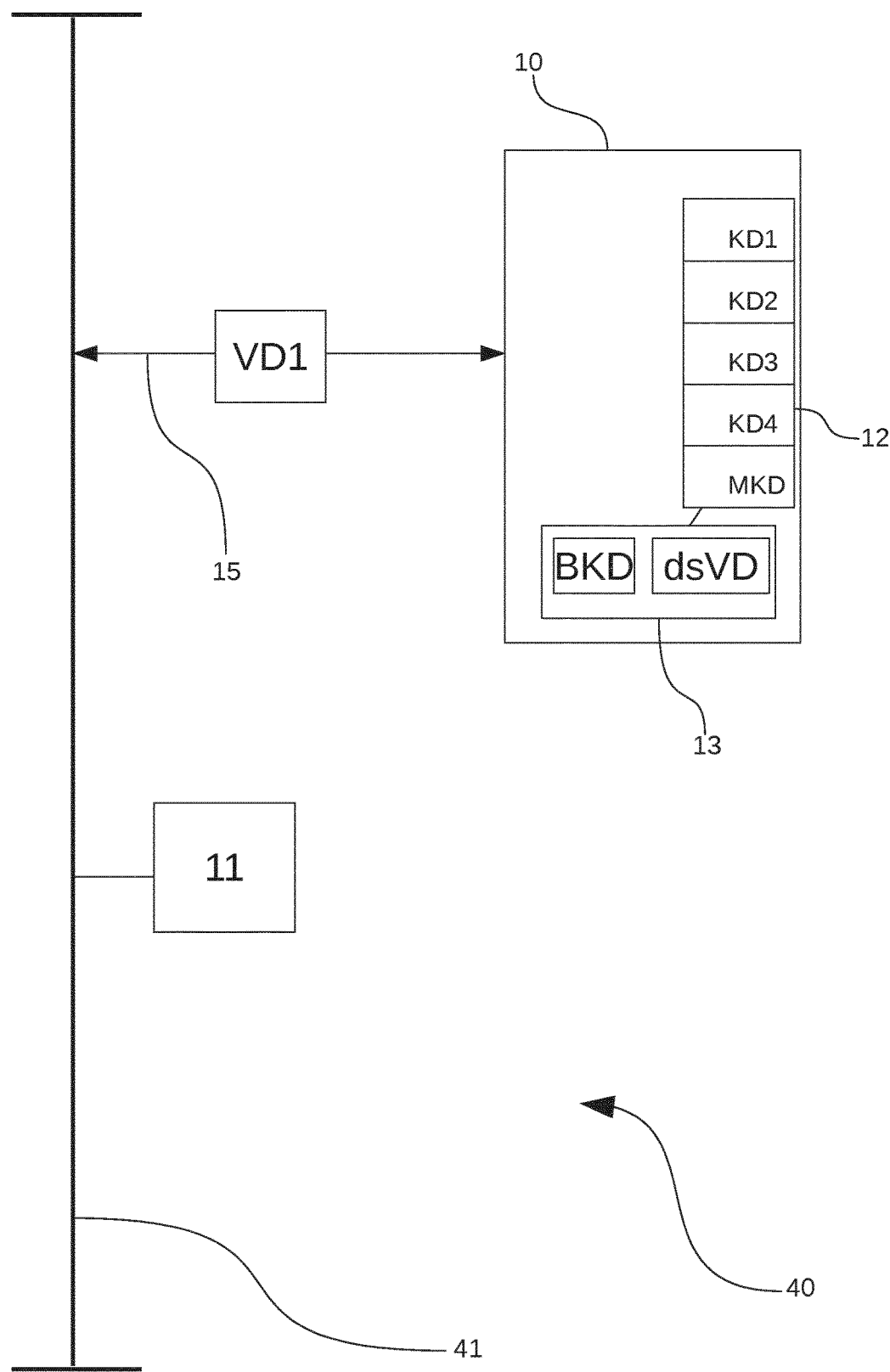
FIG. 2 shows the control device from FIG. 1 in a second data transmission system for carrying out the method according to the invention according to a further embodiment.

FIG. 2 illustrates a further embodiment of the method according to the invention. In this case, the control device 10 from FIG. 1 is separated from the data transmission system 30 and is connected to the data transmission system 40. The memory 13 of the control device 10 still stores the determination configuration data record BKD, as was selected for the data transmission system 30 in FIG. 1. The memory 13 also stores the data transmission system-specific validation data dsVD from the previous application according to FIG. 1.

The data transmission system 40 is a group comprising a bus system 41, which is likewise a FlexRay bus, and the control device 10 according to the invention as well as a further control device 11. The data transmission system 40 therefore does not correspond to the data transmission system 30 from FIG. 1.

The control device 10 which is now connected to the data transmission system 40 is started in a first step. The nonvolatile memory 13 is already available directly when starting or starting up the control device 10. Data transmission 15 is then established between the selected data transmission system 40 and the control device 10 by initializing the determination configuration data record stored in the memory 13. The initialized determination configuration data record BKD is then checked, the control device 10 receiving the validation data VD1 relating to the data transmission system 40 and comparing said data with the data transmission system-specific validation data dsVD stored in the memory 13 of the control device 10.

Since the control device 10 is now installed in a different vehicle and the data transmission system 40 does not match the data transmission system 30, a difference between the received validation data VD1 and the data transmission system-specific validation data dsVD is determined when checking the initialized configuration data record BKD. The received validation data VD1 are, for example, the chassis number of the new vehicle, with the result that this chassis number does not match the chassis number stored as data transmission system-specific validation data.

After this difference has been determined, the minimum configuration data record MKD is stored in the memory 13 of the control device 10. The minimum configuration data record is therefore defined as the configuration data record to be initialized.

The minimum configuration data record MKD can also be stored in the memory 13 in the following cases:
- if the initialized configuration data record is not checked within a previously determined period, and/or
- if the database 12 of the control device 10 is damaged, and/or
- if the data transmission system-specific validation data dsVD cannot be recognized.

During subsequent initialization of the minimum configuration data record MKD, the control device 10 is started or operated in a minimum data transmission mode, diagnostic data transmission being able to be carried out and/or an error message being able to be output in this minimum data transmission mode, for example.

In the simplest case, the minimum data transmission mode prevents incompatible communication or incompatible data transmission. A minimum requirement imposed on the control device is then operation such that the data are transmitted in the remaining data transmission system 40 as if the control device 10 were not installed.

In the exemplary embodiment illustrated in FIG. 2, the initialization of the minimum configuration data record MKD and the checking of the initialized minimum configuration data record MKD can be repeated each time the control device 10 is started. However, if the control device 10 remains installed in the data transmission system 40, such a check will not be positive.

If the control device 10 is installed back into a data transmission system 30 from FIG. 1 again, it is conceivable for the minimum configuration data record MKD to indeed be initialized when first starting the control device 10 with the selected data transmission system 30. However, it may then be determined, when checking the initialized minimum configuration data record, that the received validation data VD match the data transmission system-specific validation data dsVD stored in the memory 13. The control device 10 determines that the received validation data match the original coding data. The determination configuration data record BKD is then stored in the non-volatile memory 13 again and is defined as the configuration data record to be initialized, with the result that, during subsequent starting of the control device 10 and the associated initialization of a configuration data record, the control device 10 is operated in the configuration suitable for the selected data transmission system 30.

The number of control device variants is minimized on account of the control device 10 according to the invention and/or the method according to the invention for using a control device 10 in different data transmission systems (30; 40).

The individual exemplary embodiments described can be combined in various ways according to the invention.

LIST OF REFERENCE SYMBOLS

10 Control device
11 Further control device
12 Database
13 Memory
15 Data transmission
30 Data transmission system
31 Bus system
40 Data transmission system
41 Bus system
KD1, KD2, KD3, KD4 Configuration data records
MKD Minimum configuration data record
BKD Determination configuration data record
dsVD Data transmission system-specific validation data
VD, VD1 Validation data The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for using a control device in a plurality of data transmission systems in vehicles, the method comprising the acts of:
storing a set of configuration data records in a database of the control device, wherein each configuration data record of the set of configuration data records is initializable by the control device to establish respective data transmission connections between the control device and a different respective data transmission system of the plurality of data transmission systems;
physically connecting the control device having the stored set of configuration data records to a selected data transmission system of the plurality of data transmission systems;
establishing a data transmission connection between the selected data transmission system and the connected control device by initializing a configuration data record from the set of configuration data records; and
checking, by the control device, the initialized configuration data record by receiving validation data relating to the selected data transmission system and comparing said validation data with previously-determined data-transmission-system-specific validation data stored in a memory of the control device,
wherein the data-transmission-system-specific validation data are included in previously-determined coding data stored in the memory of the control device,
wherein the coding data comprise selection data for selecting a determination configuration data record from the set of configuration data records, and
wherein initializing the configuration data record from the set of configuration data records comprises initializing the determination configuration data record stored in the memory of the control device.

2. The method as claimed in claim 1, wherein initializing the configuration data record from the set of configuration data records comprises initializing the minimum configuration data record included in the set of configuration data record.

3. The method as claimed in claim 1, further comprising transmitting, by the selected data transmission system, a chassis number of the vehicle to the control device.

4. The method as claimed in claim 1, wherein the determination of the coding data is performed one of (i) before connecting the control device to the selected data transmission system or (ii) by connecting the control device to the selected data transmission system.

5. The method as claimed in claim 1, further comprising validating the initialized determination configuration data record if, based on said checking, it is determined that the received validation data match the data-transmission-system-specific validation data.

6. The method as claimed in claim 2, further comprising:
storing a minimum configuration data record in the memory of the control device;
defining the minimum configuration data record as the configuration data record to be initiated if at least one of:
a difference between the received validation data and the data transmission system-specific validation data is determined based on said checking,
said checking is not carried out within a previously-determined period of time,
the database of the control device is damaged, and
the data-transmission-system-specific validation data cannot be recognized.

7. The method as claimed in claim 6, wherein a minimum data transmission mode of the control device is started in response to at least one of an initialization of the minimum configuration data record, a transmission of diagnostic data, and an output of an error message in the minimum data transmission mode.

8. The method as claimed in claim 6, further comprising repeating said checking after defining the minimum configuration data record as the configuration data record to be initiated.

9. The method as claimed in claim 8, further comprising:
storing the determination configuration data record in the memory of the control device; and
defining the determination configuration data record as the configuration data record to be initialized if, based on said checking, it is determined that the received validation data match the data-transmission-system-specific validation data.

10. The method as claimed in claim 9, further comprising repeating said checking after defining the determination configuration data record as the configuration data record to be initialized.

11. A control device for use in a plurality of data transmission systems in vehicles, wherein the control device is connected to a data transmission system selected from the plurality of data transmission systems, wherein the control device is configured to:
store a set of configuration data records in a database of the control device, wherein each configuration data record of the set of configuration data records is initializable by the control device to establish respective data transmission connections between the control device and a different respective data transmission system of the plurality of data transmission systems,
physically connect to a selected data transmission system of the plurality of data transmission systems,
establish a data transmission connection with the selected data transmission system by initializing a configuration data record from the set of configuration data records, and
check the initialized configuration data record by receiving validation data relating to the selected data transmission system and comparing said validation data with previously-determined data-transmission-system-specific validation data,
wherein the data-transmission-system-specific validation data are included in previously-determined coding data stored in the memory of the control device,
wherein the coding data comprise selection data for selecting a determination configuration data record from the set of configuration data records, and
wherein initializing the configuration data record from the set of configuration data records comprises initializing the determination configuration data record stored in the memory of the control device.

12. The control device as claimed in claim 11, wherein the memory is a non-volatile memory configured to store the configuration data record to be initialized.

13. A vehicle comprising:
a data transmission system having at least one control device and a bus system, wherein the control device is configured to be used in a plurality of data transmission systems in vehicles, and is connected to a data transmission system selected from the plurality of data transmission systems, wherein the control device is configured to:
store a set of configuration data records in a database of the control device, wherein each configuration data record of the set of configuration data records is initializable by the control device to establish respective data transmission connections between the control device and a different respective data transmission system of the plurality of data transmission systems,
physically connect to the selected data transmission system of the plurality of data transmission systems,
establish a data transmission connection with the selected data transmission system by initializing a configuration data record from the set of configuration data records, and
check the initialized configuration data record by receiving validation data relating to the selected data transmission system and comparing said validation data with previously-determined data-transmission-system-specific validation data,
wherein the data-transmission-system-specific validation data are included in previously-determined coding data stored in a memory of the control device,
wherein the coding data comprise selection data for selecting a determination configuration data record from the set of configuration data records, and
wherein initializing the configuration data record from the set of configuration data records comprises initializing the determination configuration data record stored in the memory of the control device.

14. The vehicle as claimed in claim 13, wherein the data transmission system comprises at least one of a FlexRay bus, a CAN bus, a LIN bus, a MOST bus, and Ethernet.

* * * * *